(12) United States Patent
Wu

(10) Patent No.: US 10,133,909 B2
(45) Date of Patent: *Nov. 20, 2018

(54) COMPOSITE SUBSTRATE SENSOR DEVICE

(71) Applicant: Mei-Yen Lee, Hsin Chu (TW)

(72) Inventor: Hsien-Ming Wu, Taoyuan (TW)

(73) Assignee: Mei-Yen Lee, Hsin Chu (TW)

( * ) Notice: Subject to any disclaimer, the term of this patent is extended or adjusted under 35 U.S.C. 154(b) by 189 days.

This patent is subject to a terminal disclaimer.

(21) Appl. No.: 15/096,661

(22) Filed: Apr. 12, 2016

(65) Prior Publication Data

US 2016/0305796 A1 Oct. 20, 2016

(30) Foreign Application Priority Data

Apr. 14, 2015 (TW) .............................. 104111876 A

(51) Int. Cl.
*G06K 9/00* (2006.01)
(52) U.S. Cl.
CPC ....... *G06K 9/00053* (2013.01); *G06K 9/0002* (2013.01)
(58) Field of Classification Search
None
See application file for complete search history.

(56) References Cited

U.S. PATENT DOCUMENTS

| | | | | |
|---|---|---|---|---|
| 6,327,376 B1* | 12/2001 | Harkin | .................. | G01B 7/004 356/71 |
| 6,683,971 B1* | 1/2004 | Salatino | ............. | G06K 9/00053 382/124 |
| 9,864,477 B2* | 1/2018 | Ryu | ........................ | G06F 3/047 |
| 2005/0193822 A1 | 9/2005 | Amano et al. | | |
| 2009/0309180 A1 | 12/2009 | Yamagata et al. | | |
| 2010/0096710 A1* | 4/2010 | Chou | ................... | G06K 9/0002 257/414 |
| 2014/0341448 A1 | 11/2014 | Chiu | | |
| 2014/0369573 A1 | 12/2014 | Chiu | | |
| 2015/0022737 A1* | 1/2015 | Lee | ..................... | G02F 1/13338 349/12 |

(Continued)

FOREIGN PATENT DOCUMENTS

| | | |
|---|---|---|
| CN | 101663558 A | 3/2010 |
| TW | 201445699 A | 12/2014 |
| TW | 201501264 A | 1/2015 |

*Primary Examiner* — Patrick Assouad
*Assistant Examiner* — Demetrius Pretlow
(74) *Attorney, Agent, or Firm* — Muncy, Geissler, Olds & Lowe, P.C.

(57) ABSTRACT

A composite substrate sensor device comprises: a first substrate sensing chip having an upper surface, a lower surface, side surfaces and sensing circuit cells; a second substrate surrounding the first substrate sensing chip; an insulating layer set comprising insulating layers and disposed on upper surfaces of the second substrate and the first substrate sensing chip on a virtual common plane; sensing electrode cells disposed on an upper surface of the insulating layer set on a physical common plane substantially parallel to the virtual common plane; and interconnect wires formed in the insulating layer set and electrically connecting the sensing electrode cells to the sensing circuit cells, respectively, so that the sensing circuit cells sense an electric field variation of an approaching object through the sensing electrode cells and the interconnect wires.

10 Claims, 11 Drawing Sheets

(56) References Cited

U.S. PATENT DOCUMENTS

| | | | |
|---|---|---|---|
| 2015/0146944 A1* | 5/2015 | Pi | H04L 63/0861 382/124 |
| 2015/0269407 A1* | 9/2015 | Chou | G06K 9/00053 382/124 |
| 2016/0171273 A1* | 6/2016 | Ho | G06K 9/0002 324/658 |

* cited by examiner

COMPOSITE SUBSTRATE SENSOR DEVICE

This application claims priority of No. 104111876 filed in Taiwan R.O.C. on Apr. 14, 2015 under 35 USC 119, the entire content of which is hereby incorporated by reference.

BACKGROUND OF THE INVENTION

Field of the Invention

The invention relates in general to an electric field sensor array device and a method of manufacturing the same, and more particularly to a composite substrate sensor device and a method of manufacturing the same.

Description of the Related Art

A conventional non-optical type sensor array device, such as an electric field/capacitive, a thermal or a pressure sensing device applied to a fingerprint sensor, needs to sense the textures of the finger, and thus needs to have the essentially enough sensing area contacting the finger to obtain the sufficient sensing accuracy. For example, an electric field/capacitive fingerprint sensor has sensing members arranged in an array, wherein an area covered by these sensing members is the same as the sampled area of the finger. For example, in a fingerprint sensor with the resolution of 500 DPI, a pitch of the sensing members of the sensing device is equal to about 50 microns (um), and each sensing member comprises a sensing electrode cell and a corresponding sensing circuit cell thereinbelow, which are usually integrated in a semiconductor integrated circuit (IC) device, which is fabricated by a complementary metal oxide semiconductor (CMOS) manufacturing process, for example. The sensing electrode cells are formed on a top metal layer of the manufacturing process to define the pitch of the sensing members, while the corresponding sensing circuit cell is formed below or under the sensing electrode cell to form a monolithic configuration. However, when such a monolithic configuration is applied to an area sensor, the dimension of the sensing electrode cell array and its corresponding sensing circuit cell array must be equal to the dimension of the sensing area. That is, the conventional electrode cell and circuit cell have the same pitch dimension, so that the sensing area is equal to the area of the sensing members. For example, if the sensing array has 100×100 sensing members, then the 5 mm×5 mm sensing electrode cell area and the 5 mm×5 mm sensing circuit cell area thereunder need to be provided. If the peripheral analog and digital circuits are added, then the overall area of the fingerprint sensor or chip is very large, so that the device cost is relatively high.

Therefore, how to reduce the area of the sensing members while keeping the equivalent large sensing area is an innovation to be proposed.

SUMMARY OF THE INVENTION

It is therefore an object of the invention to provide a sensor device with the reduced area of the sensing circuit cells and the equivalent large sensing area, and a method of manufacturing the same.

To achieve the above-identified object, the invention provides a composite substrate sensor device comprising: a first substrate sensing chip having an upper surface, a lower surface, side surfaces connected to the upper surface and the lower surface and sensing circuit cells disposed below the upper surface; a second substrate surrounding the side surfaces of the first substrate sensing chip; an insulating layer set comprising insulating layers disposed on an upper surface of the second substrate and the upper surface of the first substrate sensing chip, wherein the upper surface of the second substrate and the upper surface of the first substrate sensing chip are disposed on a virtual common plane; sensing electrode cells disposed on an upper surface of the insulating layer set, wherein the upper surface of the insulating layer set is disposed on a physical common plane, and the virtual common plane is substantially parallel to the physical common plane; and interconnect wires, which are formed in the insulating layer set and electrically connect the sensing electrode cells to the sensing circuit cells, respectively, so that the sensing circuit cells sense an electric field variation of an approaching object through the sensing electrode cells and the interconnect wires.

The invention also provides a method of manufacturing a composite substrate sensor device, the method comprising the steps of: providing a first substrate sensing chip, which has an upper surface, a lower surface, side surfaces connected to the upper surface and the lower surface and sensing circuit cells disposed below the upper surface; providing a second substrate surrounding the side surfaces of the first substrate sensing chip; forming an insulating layer set, comprising insulating layers, on an upper surface of the second substrate and the upper surface of the first substrate sensing chip, and interconnect wires disposed in the insulating layer set; and forming sensing electrode cells on an upper surface of the insulating layer set, wherein the sensing electrode cells are electrically connected to the sensing circuit cells through the interconnect wires, so that the sensing circuit cells sense an electric field variation of an approaching object through the sensing electrode cells and the interconnect wires.

With the device and method of the invention, a small-area sensing chip can be used to manufacture a composite substrate sensor device for sensing the fingerprint. Therefore, the manufacturing cost of the fingerprint sensor device can be lowered.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

In each embodiment of the invention, a sensing chip (may be regarded as a first substrate) is embedded into a second substrate, which may be a molding compound in this embodiment, to form a combination (may be regarded as a composite substrate), on which interconnections and electrodes are formed, so that a composite electric field sensor array device may be formed and applied to a fingerprint sensor device or any device for sensing an electric field variation of an approaching object. In this invention, the second substrate may comprise, for example but without limitation to, a molding compound substrate, or an arbitrary substrate, such as a semiconductor substrate, or an insulating glass substrate, or the like. Consequently, the sensing chip and the sensing electrode cells are formed in different manufacturing processes. The chip area of the sensing chip can be effectively reduced without changing the effective area dimension of the sensing electrode cell array, and the device cost can be decreased. Furthermore, multiple sensing chips may be integrated according to the technology of each embodiment of the invention to meet various requirements.

Figure 1:
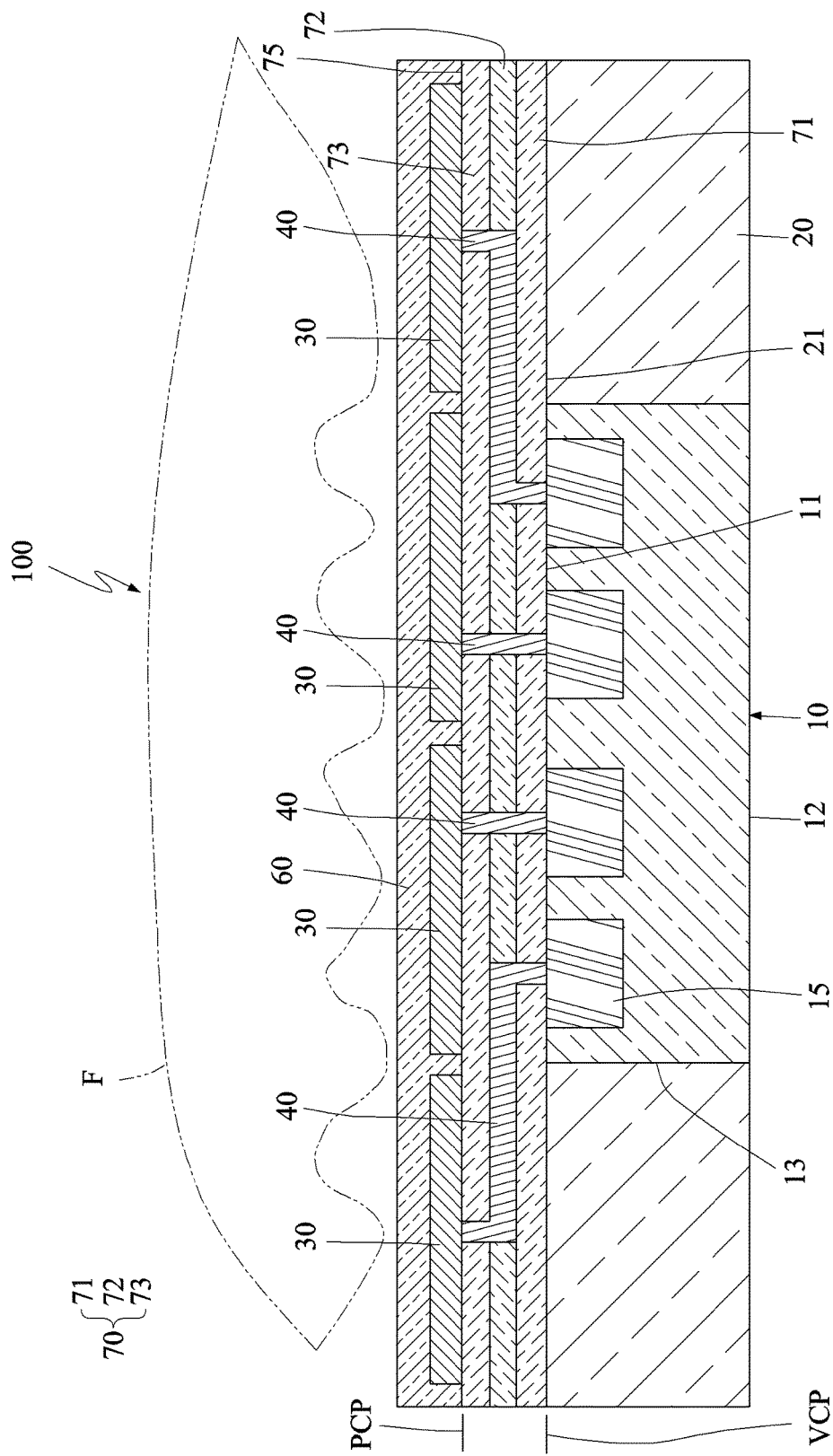
FIG. 1 is a schematically cross-sectional view showing a composite substrate sensor device according to a first embodiment of the invention.

FIG. 1 is a schematically cross-sectional view showing a composite substrate sensor device 100 according to a first embodiment of the invention.

Referring to FIG. 1, the composite substrate sensor device 100 of this embodiment comprises a first substrate sensing chip 10, a second substrate (molding compound layer) 20, an insulating layer set 70, sensing electrode cells 30 and interconnect wires 40.

The first substrate sensing chip 10 has an upper surface 11, a lower surface 12, side surfaces 13 connected to the upper surface 11 and the lower surface 12 and sensing circuit cells 15 disposed below the upper surface 11.

The first substrate sensing chip 10 is embedded into the second substrate 20, which in this embodiment is a molding compound layer 20 surrounding the side surfaces 13 of the first substrate sensing chip 10. The insulating layer set 70 comprises insulating layers (e.g., the insulating layers 71, 72 and 73), disposed on an upper surface 21 of the molding compound layer 20 and the upper surface 11 of the first substrate sensing chip 10, wherein the upper surface 21 of the molding compound layer 20 and the upper surface 11 of the first substrate sensing chip 10 are disposed on a virtual common plane VCP.

The sensing electrode cells 30 is disposed on an upper surface 75 of the insulating layer set 70, which is disposed on a physical common plane PCP. The virtual common plane VCP is substantially parallel to the physical common plane PCP, and is separated from the physical common plane PCP by a distance, which is a vertical height of the insulating layer set 70. In this embodiment, the sensing electrode cells 30 uniformly distributed over the first substrate sensing chip 10 and the second substrate 20, so that the area of the first substrate sensing chip 10 is minimized without sacrificing a physical sensing area of the composite substrate sensor device 100 (the exposed contacting area with the finger). In another embodiment, the sensing electrode cells 30 is non-uniformly distributed over the first substrate sensing chip 10 and the second substrate 20. In still another embodiment, the sensing electrode cells 30 is disposed only above the first substrate sensing chip 10 or the second substrate 20.

The interconnect wires 40 are formed in the insulating layer set 70, and electrically connect the sensing electrode cells 30 to the sensing circuit cells 15, respectively, so that the sensing circuit cells 15 sense an electric field variation of an approaching object through the sensing electrode cells 30 and the interconnect wires 40. In a non-restrictive example of this embodiment, the fingerprint of a finger F is sensed because the distance from the ridge or valley of the finger F to the sensing electrode cell can be calculated according to the electric field variation, so that the information regarding the distance between the sensing electrode cell 30 and the ridge or valley of the finger F can be obtained.

In this embodiment, multiple sensing circuit cells 15 constitute a sensing circuit cell array, wherein the number of the interconnect wires 40 is equal to the number of the sensing electrode cells 30 so that the interconnect wires 40 correspond to the sensing electrode cells 30 in a one-to-one manner. In another embodiment, one sensing circuit cell 15 may correspond to multiple interconnect wires and sensing electrode cells, so that the number of the sensing circuit cells 15 and the area of the first substrate sensing chip can be further reduced; or one sensing circuit cell 15 may correspond to multiple interconnect wires and one sensing electrode cell to prevent the failed interconnect wire from affecting the product yield.

In addition, the composite substrate sensor device 100 may further comprise a device protection layer 60 disposed on the insulating layer set 70 and the sensing electrode cells 30, the device protection layer 60 and the finger F directly or indirectly contact with each other to protect the sensing electrode cells 30. Because the first substrate sensing chip 10 and the second substrate 20 function as two substrates, this embodiment is referred to as the composite substrate sensor device 100. The sensing electrode cells 30 and the interconnect wires 40 are disposed above the first substrate sensing chip 10 and the second substrate 20. That is, when the sensing electrode cells 30, the interconnect wires 40 and the sensing circuit cells 15 are orthogonally projected onto the virtual common plane VCP or the physical common plane PCP, a covering range of the interconnect wires 40 covers a covering range of the sensing circuit cell 15, and/or a covering range of the sensing electrode cells 30 covers the covering range of the sensing circuit cell 15.

Figure 2:
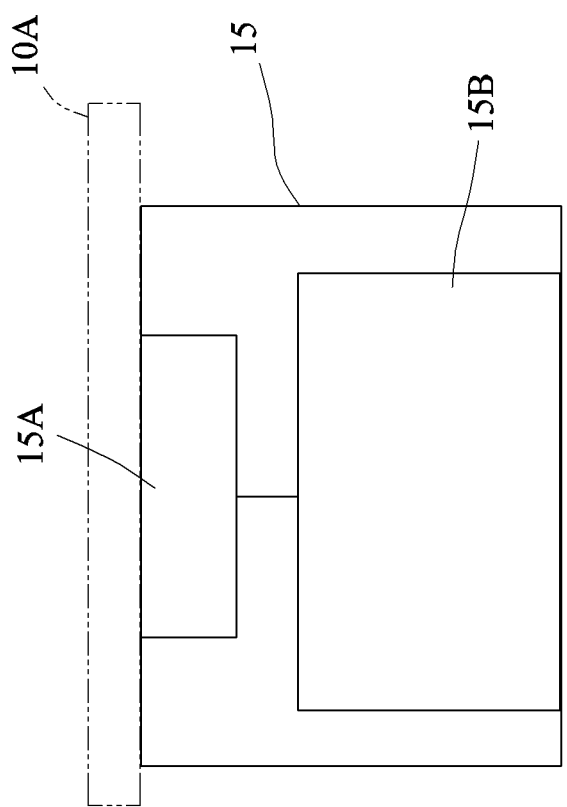
FIG. 2 is a schematic view showing a sensing circuit cell according to the first embodiment of the invention.

FIG. 2 is a schematic view showing the sensing circuit cell 15 according to the first embodiment of the invention. Referring to FIG. 2, the sensing circuit cell comprises a transmission electrode 15A and a physical portion 15B of the sensing circuit cell electrically connected to the transmission electrode 15A, the transmission electrode 15A is electrically connected to the interconnect wire 40 and functions for signal transmission. In one example, the physical portion 15B of the sensing circuit cell may comprise partial or whole circuits including a front-end sensing circuit, an analog-to-digital converting circuit, a gain amplifier circuit, an operational amplifier and the like. It is worth noting that when the sensing circuit cell 15 is not combined with the second substrate (molding compound layer) 20, a chip protection layer 10A may cover the transmission electrode 15A because many first substrate sensing chips 10 may be formed on a wafer and then diced and packaged. Thus, the chip protection layer 10A can protect the transmission electrode 15A.

In this embodiment, the insulating layer set 70 is constituted by three insulating layers. In another embodiment, the insulating layer set 70 may be constituted by four or more than four insulating layers, and this depends on the layout skills of the interconnect wires 40. When a ratio of the horizontal area of the sensing circuit cells 15 to the horizontal area of the sensing electrode cells 30 gets smaller, the required insulating layers get more.

Figure 3:
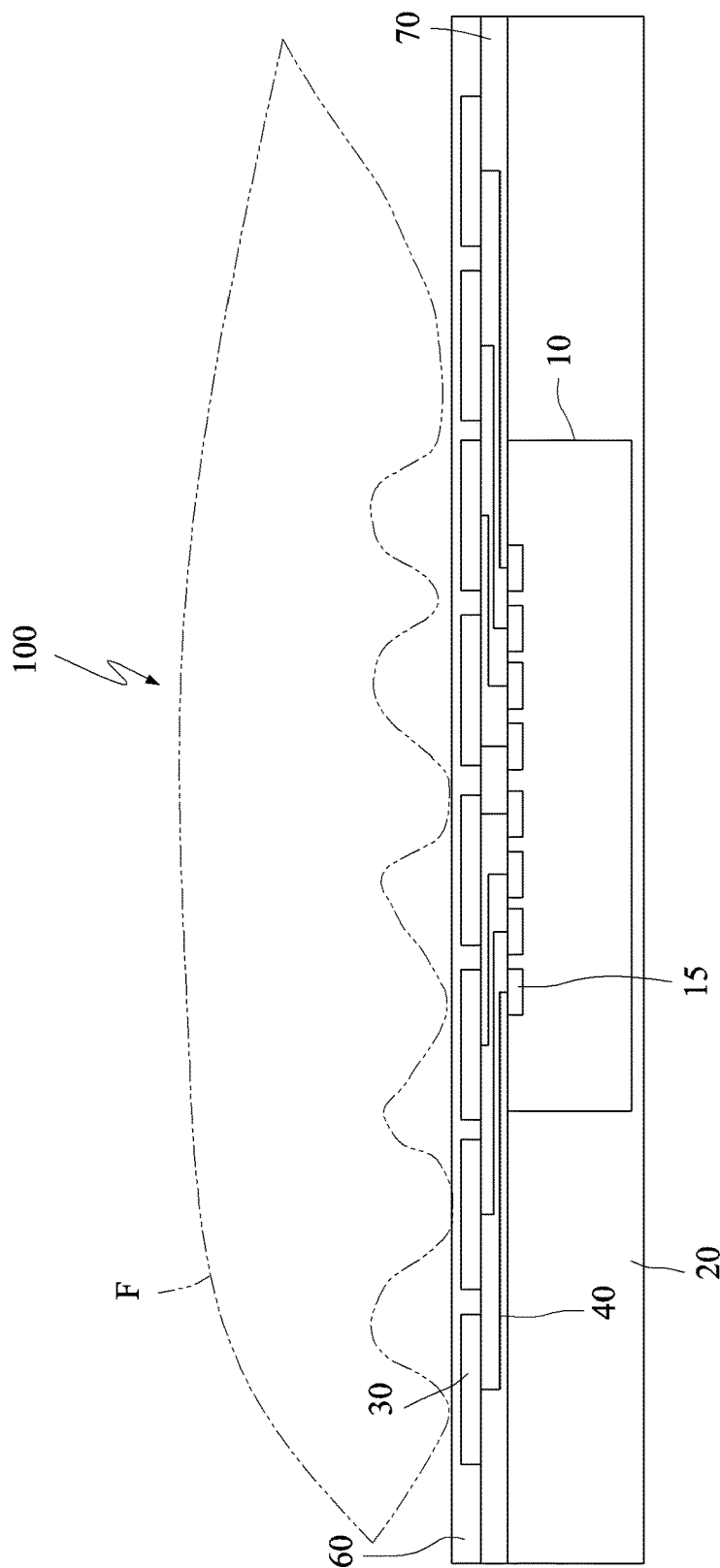
FIG. 3 is a schematic front view showing a second embodiment of the invention.
Figure 4:
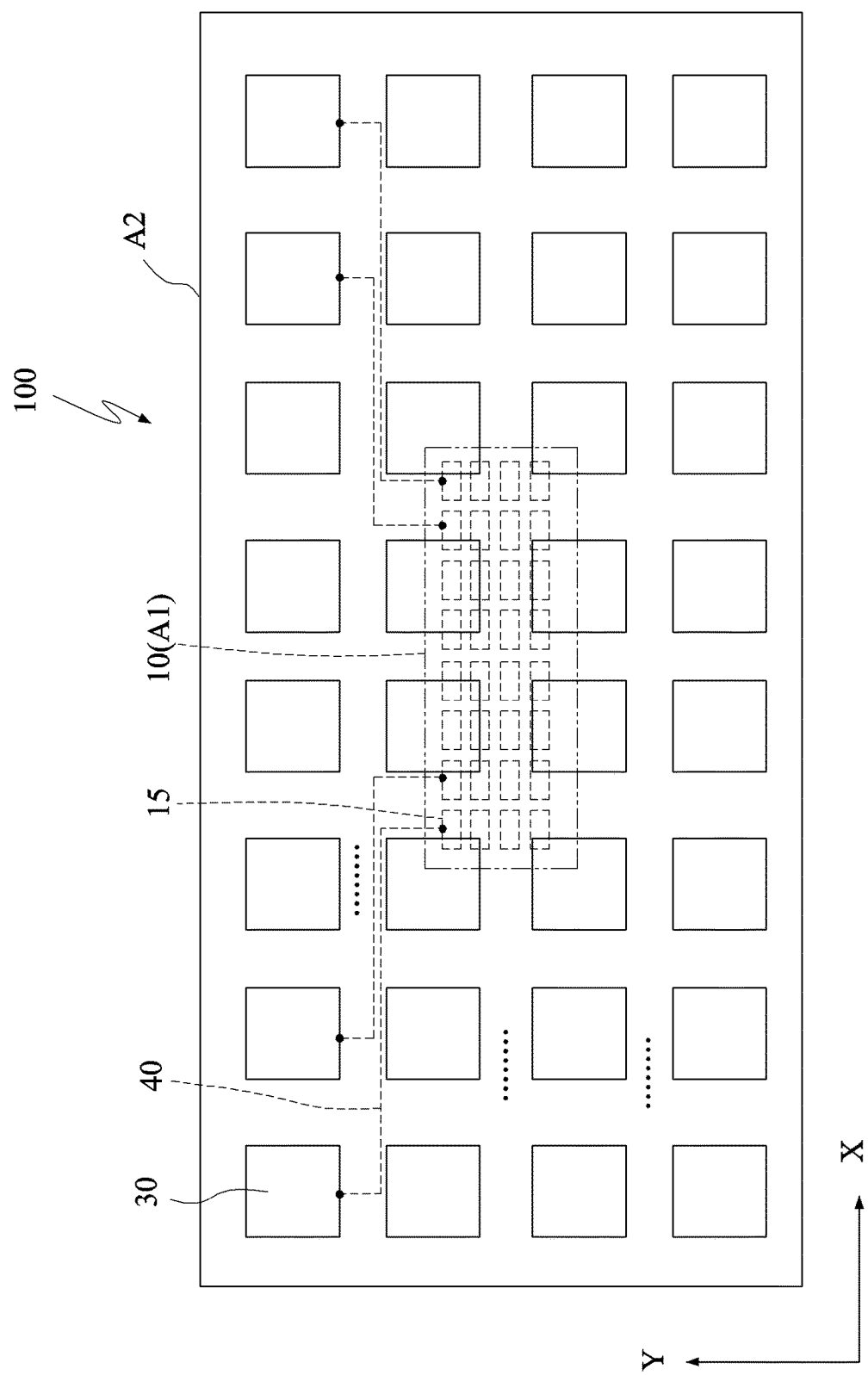
FIG. 4 is a schematic top view showing the second embodiment of the invention.

FIG. 3 is a schematic front view showing a second embodiment of the invention. FIG. 4 is a schematic top view showing the second embodiment of the invention. Referring to FIGS. 3 and 4, the sensing circuit cells 15 are arranged into a first array A1, the sensing electrode cells 30 are arranged into a second array A2, each of the first array A1 and the second array A2 has an X-axis and a Y-axis perpendicular to each other, the dimension of the first array A1 on the X-axis is smaller than or equal to the dimension of the second array A2 on the X-axis, and the dimension of the first array A1 on the Y-axis is smaller than or equal to the dimension of the second array A2 on the Y-axis. That is, the interconnect wires 40 have the one-dimensional or two-dimensional fan-out expansion from the sensing circuit cells 15 to the sensing electrode cells 30.

Figure 5:
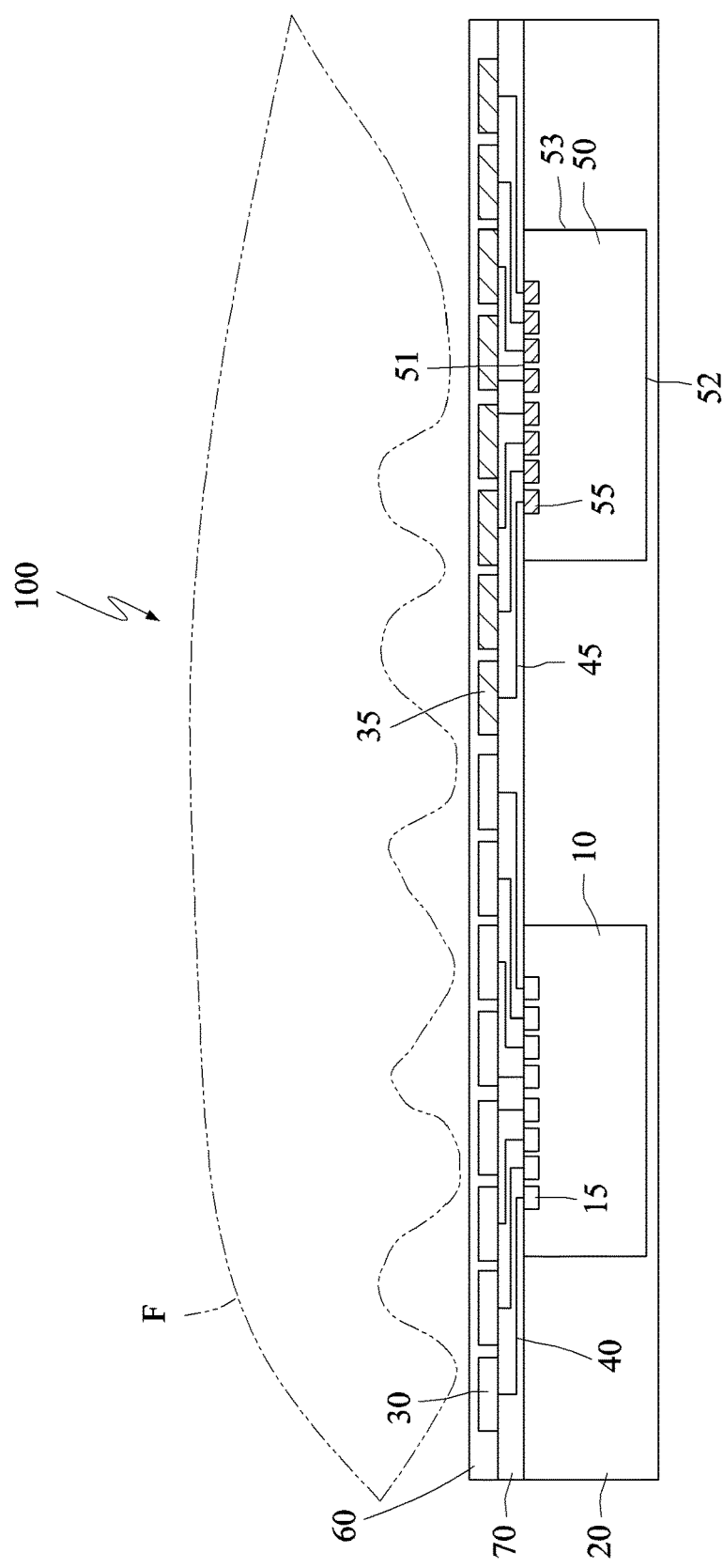
FIG. 5 is a schematic front view showing a third embodiment of the invention.

FIG. 5 is a schematic front view showing a third embodiment of the invention. Referring to FIG. 5, the composite substrate sensor device 100 of this embodiment is similar to the first embodiment except that the sensor device 100 further comprises a second substrate sensing chip 50, second sensing electrode cells 35 and second interconnect wires 45.

The second substrate sensing chip 50 has an upper surface 51, a lower surface 52, side surfaces 53 connected to the upper surface 51 and the lower surface 52 and second sensing circuit cells 55 disposed below the upper surface 11 of the second substrate sensing chip 50. The molding compound layer 20 surrounds the side surfaces 53 of the second substrate sensing chip 50, and the insulating layer set 70 is disposed on the upper surface 21 of the molding compound layer 20, the upper surface 11 of the first substrate sensing chip 10 and the upper surface 51 of the second substrate sensing chip 50. The second sensing electrode cells 35 is disposed on the upper surface 75 of the insulating layer set 70 and the upper surface 11 of the second substrate sensing chip 50. The second interconnect wires 45 are formed in the insulating layer set 70, and electrically connect the second sensing electrode cells 35 to the second sensing circuit cells 55, respectively, so that the second sensing circuit cells 55 sense the fingerprint of the finger F through the second sensing electrode cells 35 and the second interconnect wires 45 in conjunction with the sensing circuit cells 15.

In this embodiment, the second substrate sensing chip 50 and the first substrate sensing chip 10 may have the same function and dimension, and the second substrate sensing chip 50 and the first substrate sensing chip 10 are actually electrically connected together (not shown) through, for example, a power supply or synchronous clock. In addition, the data of one of them may be transmitted to the other one of them, which will transmit the merged data to the outside, wherein different designs may be regarded as for the system design and data transmission between independent chips. However, the most important characteristic of the invention is to create the maximum physical sensing area with the smallest chip area. Consequently, the sensing chip may be manufactured in a mass production manner and used as a standard sensing chip. When the designer needs multiple sensing chips to complete the composite substrate sensor device, multiple sensing chips can be used. In another embodiment, the second substrate sensing chip 50 and the first substrate sensing chip 10 may have different functions and dimensions, and be used as two standard elements to be selected by the designer. It is worth noting that in the second substrate sensing chip 50 and the first substrate sensing chip 10, not all sensing circuit cells need to be connected to the sensing electrode cells, so that the designer's requirements can be satisfied.

Figure 6:
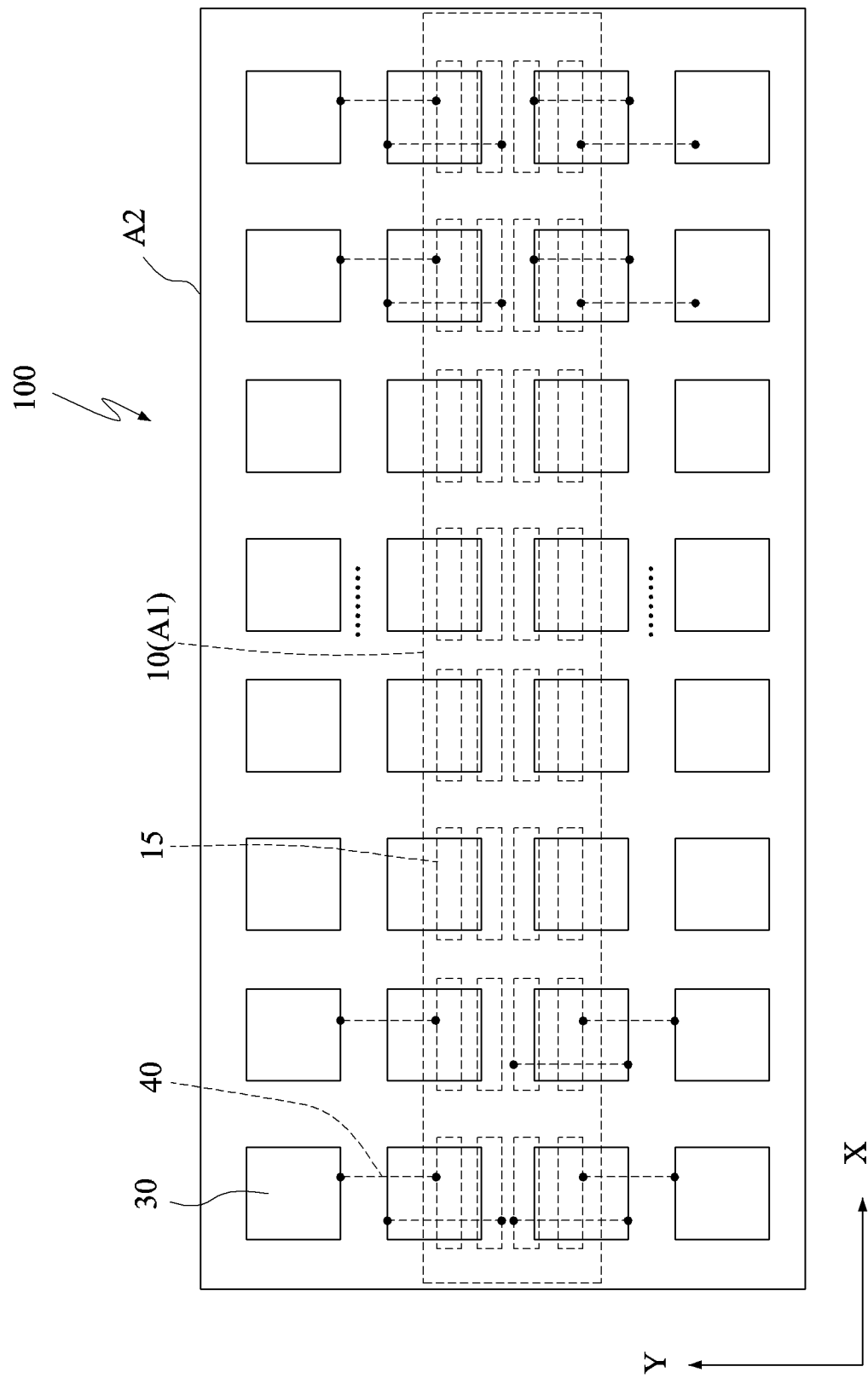
FIG. 6 is a schematic top view showing a fourth embodiment of the invention.

FIG. 6 is a schematic top view showing a fourth embodiment of the invention. Referring to FIG. 6, this embodiment is similar to the second embodiment except that the interconnect wires 40 are expanded from the sensing circuit cells 15 to the sensing electrode cells 30 in a one-dimensional manner (i.e., along the Y-axis direction). Thus, the dimension of the first array A1 on the X-axis is substantially equal to the dimension of the second array A2 on the X-axis, and the dimension of the first array A1 on the Y-axis is smaller than the dimension of the second array A2 on the Y-axis. The advantage is that the sensing circuit cell 15 may be manufactured as longitudinal, and the only one-dimensional expanded interconnections are simpler. According to FIGS. 4 and 6, another characteristic of the invention is that the electrode sensing members are designed to be distributed over the first and the second substrates to minimize the geometric area of the sensing chip without sacrificing the physical sensing area (the exposed contacting area with the finger). Of course, the spirit of this embodiment may also comprise that the sensing electrode cells are only disposed above the second substrate. In addition, the electrode sensing members of the invention provide the vertical sensing mechanism for sensing an electric field variation of an approaching object. The advantage thereof is that the sensitivity still can be obtained even if a predetermined distance is formed between the approaching object and the electrode sensing member. Such design is also different from a conventional lateral electric field sensing method (e.g., the projective capacitive design of the touch panel). In this vertical type electric field sensing design, for example, the sensor device may be disposed under the display cover glass or back cover of the mobile phone to form a hidden configuration.

Figure 7A:
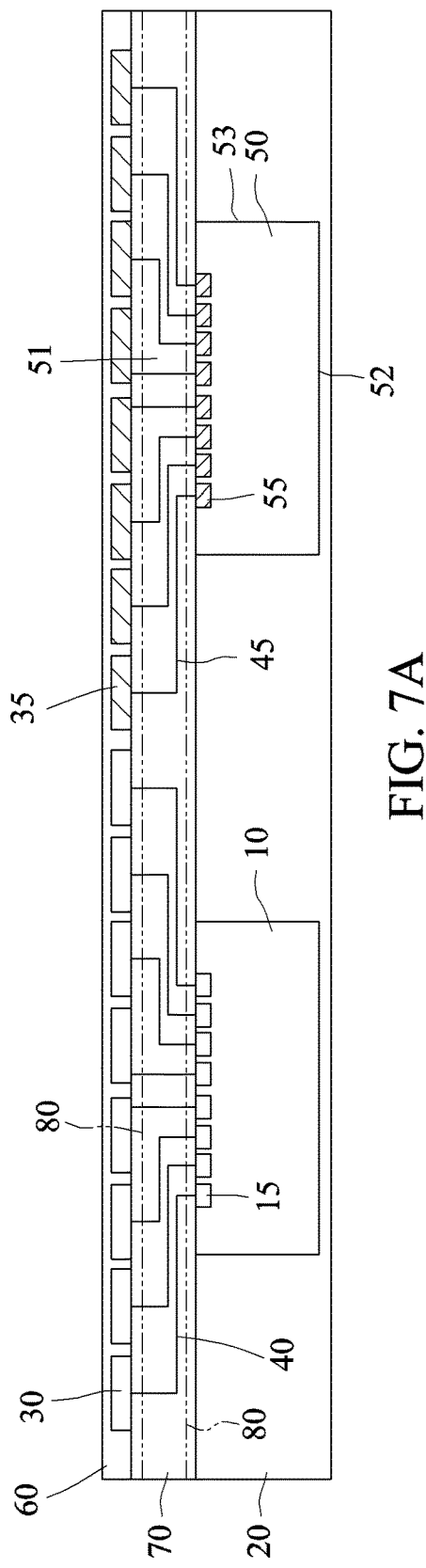
FIGS. 7A and 7B are schematic front views showing two examples according to a fifth embodiment of the invention.
Figure 7B:
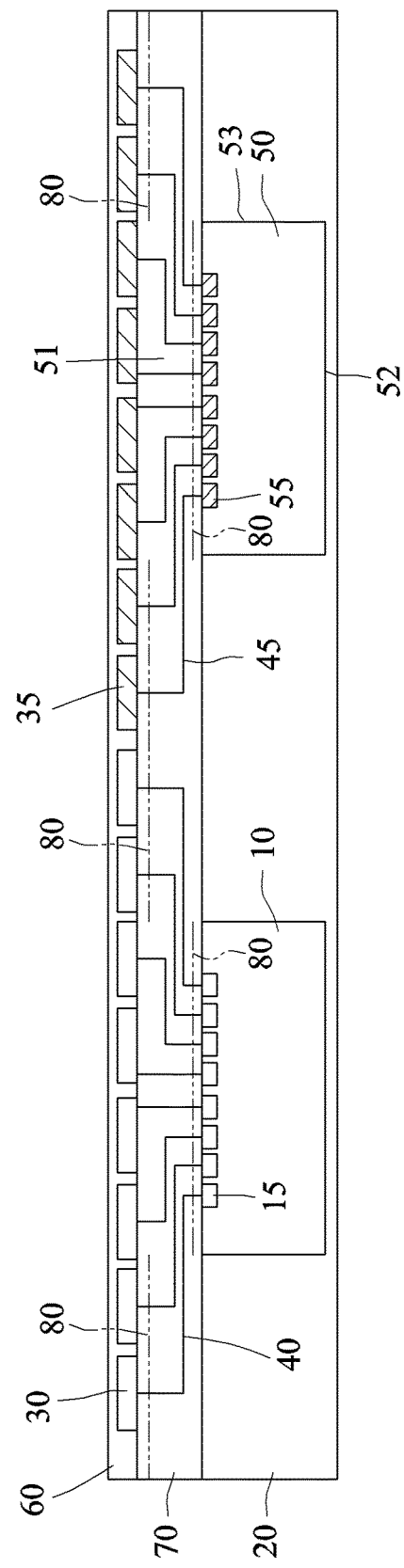

FIGS. 7A and 7B are schematic front views showing two examples according to a fifth embodiment of the invention. As shown in FIG. 7A, this embodiment is similar to the third embodiment except that the composite substrate sensor device further comprises two electroconductive partitioning layers 80, which are disposed between the sensing electrode cell 30 and the sensing circuit cell 15, and coupled to a constant potential (e.g., 5V, 3.3V or the ground potential etc.) to isolate the sensing electrode cell 30 from the sensing circuit cell 15 from interfering with each other. It is to be noted that one of the electroconductive partitioning layers 80 may be omitted without affecting the isolating effect of the invention. So, in another embodiment, there could be only one electroconductive partitioning layer 80. The electroconductive partitioning layers 80 are disposed on the same plane. It is worth noting that the electroconductive partitioning layers 80 are not electrically connected to the interconnect wires 40 and 45, and that only one electroconductive partitioning layer 80 can achieve the isolation effect. As shown in FIG. 7B, this example is similar to FIG. 7A except that the electroconductive partitioning layers 80 are disposed on two different level planes, respectively, and may be partially overlap or do not overlap with each other when being orthogonally projected onto the horizontal plane. It is to be noted that the electroconductive partitioning layers 80 may also be regarded as one electroconductive partitioning layer.

Figure 8:
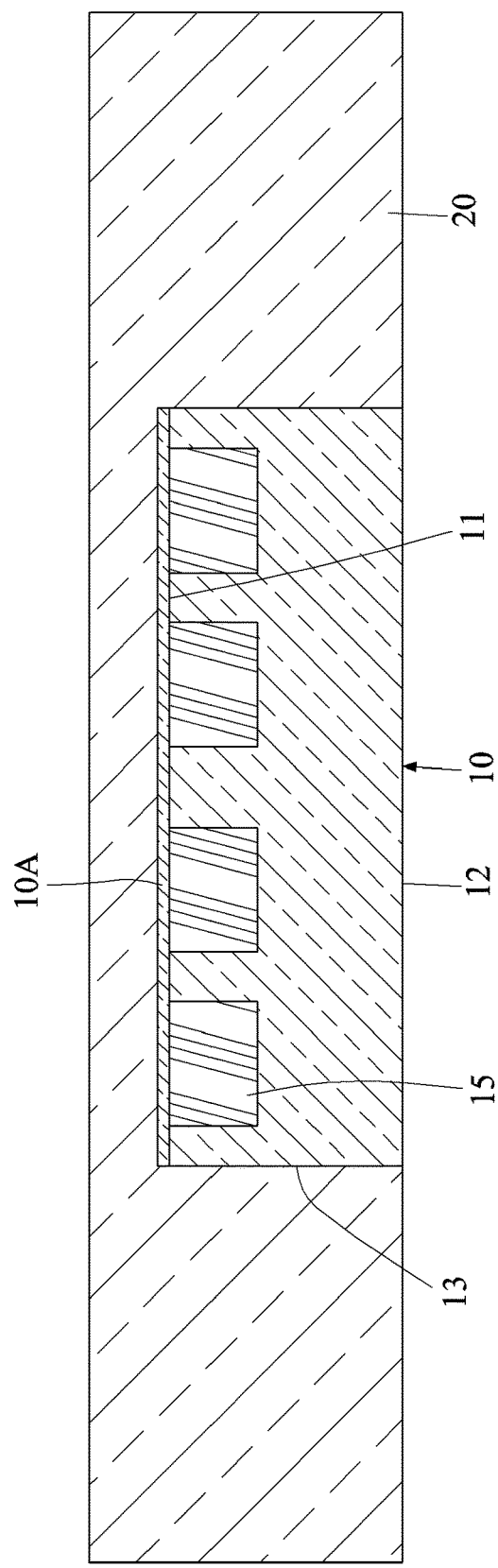
FIGS. 8 and 9 are schematically cross-sectional views showing structures of steps in the manufacturing method of the first embodiment.
Figure 9:
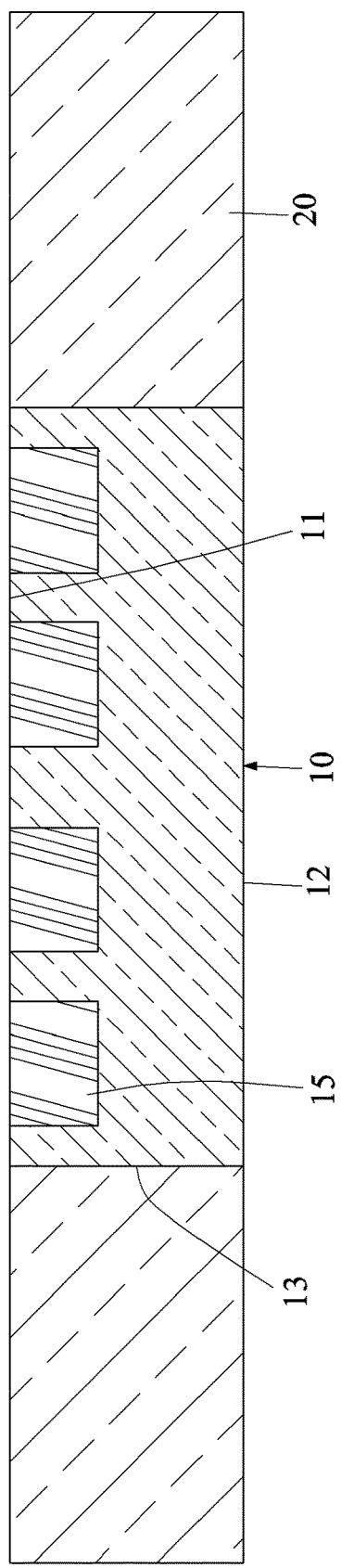

FIGS. 8 and 9 are schematically cross-sectional views showing structures of steps in the manufacturing method of the first embodiment. Referring to FIGS. 8 and 9, the manufacturing method of the composite substrate sensor device 100 comprises the following steps. First, as shown in FIG. 8, the first substrate sensing chip 10 having the upper surface 11, the lower surface 12, the side surfaces 13 connected to the upper surface 11 and the lower surface 12 and sensing circuit cells 15 disposed below the upper surface 11 is provided. The first substrate sensing chip 10 is manufactured from a silicon wafer by semiconductor manufacturing processes. The first substrate sensing chip 10 may have the chip protection layer 10A in this example, and may have no chip protection layer 10A in another example.

Then, the molding compound layer 20 surrounding the side surfaces 13 of the first substrate sensing chip 10 is provided. The molding compound layer 20 also covers the first substrate sensing chip 10 and the chip protection layer 10A. The details will be described in the following. First, the first substrate sensing chip 10 is placed into a mold (not shown), and the molding compound layer 20 is poured to surround the side surfaces 13 of the first substrate sensing chip 10, the upper surface 11 and the lower surface 12, as shown in FIG. 8. Then, a grinding back process is performed to remove the molding compound layer 20 disposed on the upper surface 11 of the first substrate sensing chip 10, and to expose the sensing circuit cell 15, especially the transmission electrode 15A of the sensing circuit cell 15, as shown in FIGS. 9 and 2. That is, the grinding back step is executed to remove the chip protection layer 10A disposed on the first substrate sensing chip 10 until the transmission electrode 15A of the sensing circuit cell 15 is exposed. Of course, the removing process may also be stopped on the chip protection layer 10A, and the transmission electrode 15A may also be exposed by the typical lithography technology.

Next, as shown in FIG. 1, the insulating layer set 70 comprising the insulating layers 71, 72 and 73 and the interconnect wires 40 disposed on the insulating layer set 70 are formed on or above the upper surface 21 of the molding compound layer 20 and the upper surface 11 of the first substrate sensing chip 10. The interconnect wires 40 and the insulating layers 71, 72 and 73 may be formed by way of, but without limitation to, electroplating, etching or depositing, especially the wiring forming processes compatible with the semiconductor manufacturing processes. Because those skilled in the art can easily understand how to implement this technology, detailed descriptions thereof will be omitted.

Then, as shown in FIG. 1, the sensing electrode cells 30 are formed on the upper surface 75 of the insulating layer set 70, wherein the sensing electrode cells 30 are electrically connected to the sensing circuit cells 15 through the interconnect wires 40. Thus, the sensing circuit cells 15 can sense the fingerprint of the finger F through the sensing electrode cells 30 and the interconnect wires 40. Of course, the device protection layer 60 directly or indirectly contacting with the finger F may be formed on the insulating layer set 70 and the sensing electrode cells 30. The device protection layer 60 is preferably made of a wear-resistant material with a dielectric coefficient.

Figure 10:
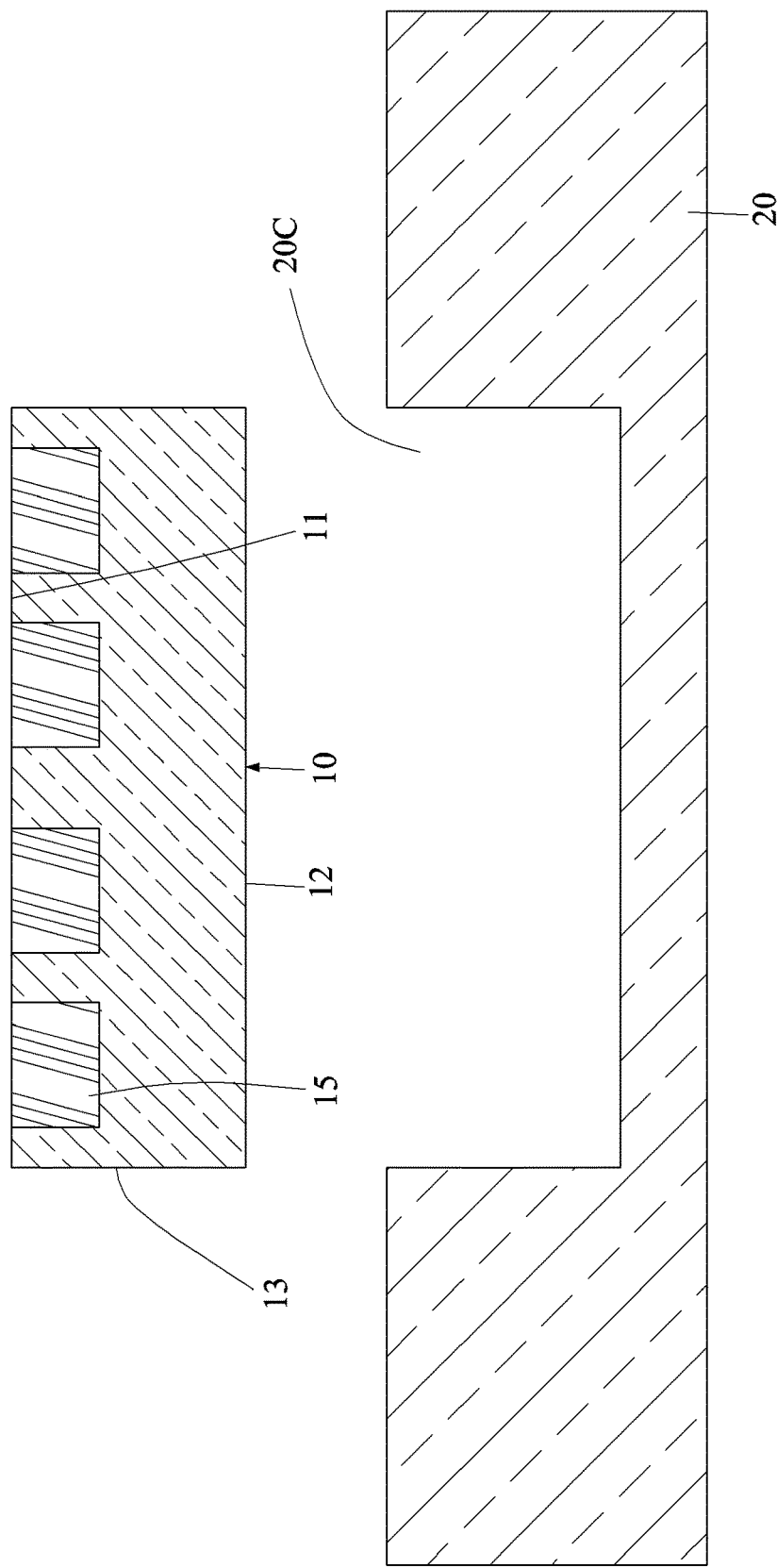
FIG. 10 is a schematically cross-sectional view showing a manufacturing method according to another example of the first embodiment.

Of course, the above-mentioned manufacturing processes are described for the purpose of making those skilled in the art be able to implement this invention, but the spirit of the invention is not restricted thereto. For example, FIG. 10 is a schematically cross-sectional view showing a manufacturing method according to another example of the first embodiment. The second substrate 20 may also be an arbitrary substrate like the semiconductor or insulator, such as a glass substrate or the like, and may be manufactured by firstly defining a geometric slot 20C with the dimensions the same as or slightly larger than the first substrate sensing chip 10 on the second substrate 20, embedding the first substrate sensing chip 10 into the second substrate 20, and then performing integration by the processes of FIGS. 8 and 9 to manufacture the insulating layer set 70, the interconnect wires 40, the array of the sensing electrode cells 30 and the device protection layer 60. It is worth noting that the slot 20C of FIG. 10 does not penetrate through the second substrate 20, so the bottom layer portion of the second substrate 20 may be ground after the first substrate sensing chip 10 is embedded therein to obtain the structure of FIG. 9. Of course, the slot 20C penetrating through the second substrate 20 may also be directly provided, and then the first substrate sensing chip 10 is embedded into the second substrate 20 to obtain the structure of FIG. 9. Alternatively, the bottom layer portion of the second substrate 20 needs not to be removed in another example.

Figure 11:
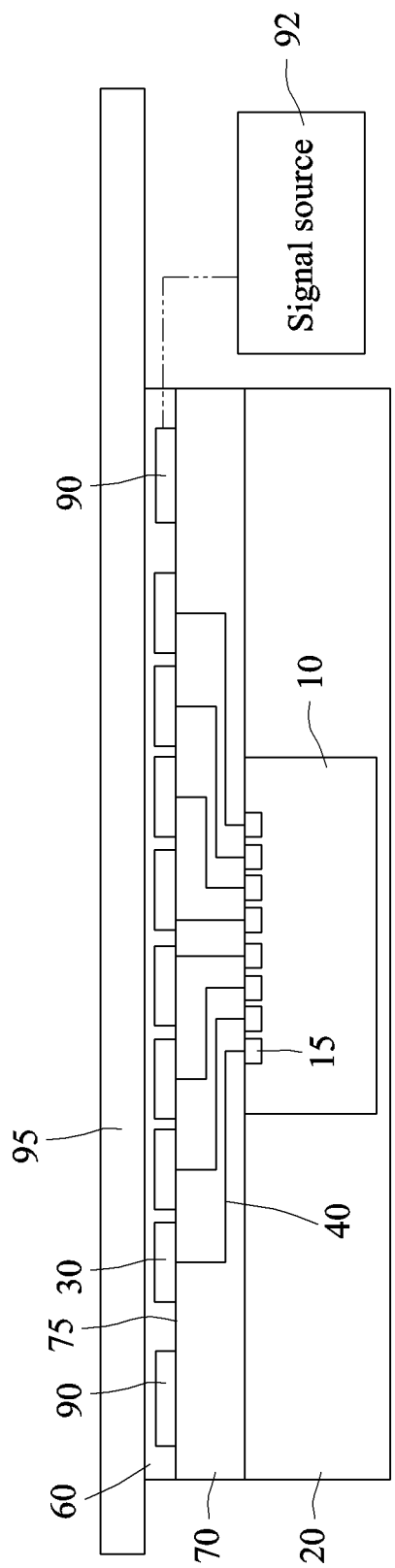
FIG. 11 is a schematic front view showing a sixth embodiment of the invention.

FIG. 11 is a schematic front view showing a sixth embodiment of the invention. Referring to FIG. 11, this embodiment is similar to the first embodiment except that the composite substrate sensor device further comprises an electric field emitting cell 90 disposed on the upper surface 75 of the insulating layer set 70 and outside the array of the sensing electrode cells 30 to form a rectangular ring, for example. The electric field emitting cell 90 is coupled to a signal source 92 and generates an electric field. Of course, the signal source may also be an integrated circuit integrated with the first substrate sensing chip, or another independent circuit chip or module. In this embodiment, the device protection layer 60 is disposed on the insulating layer set 70, the sensing electrode cells 30 and the electric field emitting cell 90. The electric field emitting cell 90 and the sensing electrode cells 30 may be formed in the same manufacturing process concurrently. Then, the device protection layer 60 is formed on the insulating layer set 70, the sensing electrode cells 30 and the electric field emitting cell 90. In addition, the composite substrate sensor device may pertain to one portion of an electronic apparatus (e.g., mobile phone, tablet computer or the like), and thus further comprise a cover plate 95 covering the device protection layer 60 so that the finger contacts the device protection layer 60 through the cover plate 95. The device protection layer 60 may be adhered to the cover plate 95 through an adhesive (not shown). In one example, the cover plate 95 is an outermost layer of a touch screen of a mobile phone, and may be made of a glass or sapphire material. Thus, a hidden sensor device may be manufactured to provide a beautiful and defect-free outlook for the electronic apparatus without affecting the sensing function. In still another example, the manufactured composite substrate sensor device does not comprise the device protection layer 60, and the adhesive for adhering the cover plate 95 functions as the device protection layer for adhering the cover plate 95 to the electric field emitting cell 90, so that the cover plate 95 covers the electric field emitting cells 90. In still another example, all the sensing electrode cells 30 are arranged above the first substrate sensing chip 10, and all the electric field emitting cells 90 are disposed above the second substrate 20 to achieve the partitioning and managing function. This is because that the operation of the electric field emitting cell 90 needs the rapid clock switching, which is similar to the digital circuit mode, and the operation of the sensing electrode cell 30 pertains to the mode of the analog sensing circuit. The analog circuit operation is easily affected by the interference of the digital circuit, so the partitioning and managing configuration can avoid the interference.

With each embodiment of the invention, a small-area sensing chip can be used to manufacture a composite substrate sensor device for sensing the fingerprint. Therefore, the manufacturing cost of the fingerprint sensor device can be lowered.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A composite substrate sensor device, comprising:
a first substrate sensing chip having an upper surface, a lower surface, side surfaces connected to the upper surface and the lower surface and sensing circuit cells disposed below the upper surface;
a second substrate surrounding the side surfaces of the first substrate sensing chip;
an insulating layer set comprising insulating layers disposed on an upper surface of the second substrate and the upper surface of the first substrate sensing chip, wherein the upper surface of the second substrate and the upper surface of the first substrate sensing chip are disposed on a virtual common plane;
sensing electrode cells disposed on an upper surface of the insulating layer set, wherein the upper surface of the insulating layer set is disposed on a physical common plane, and the virtual common plane is substantially parallel to the physical common plane; and
interconnect wires, which are formed in the insulating layer set and electrically connect the sensing electrode cells to the sensing circuit cells, respectively, so that the sensing circuit cells sense an electric field variation of an approaching object through the sensing electrode cells and the interconnect wires.

2. The composite substrate sensor device according to claim 1, further comprising:
a second substrate sensing chip having an upper surface, a lower surface, side surfaces connected to the upper surface and the lower surface and second sensing circuit cells disposed below the upper surface of the second substrate sensing chip, wherein the second substrate surrounds the side surfaces of the second substrate sensing chip, the insulating layer set is disposed on the upper surface of the second substrate, the upper surface of the first substrate sensing chip and the upper surface of the second substrate sensing chip;
second sensing electrode cells disposed on the upper surface of the insulating layer set and the upper surface of the second substrate sensing chip; and
second interconnect wires, which are formed in the insulating layer set, and electrically connect the second sensing electrode cells to the second sensing circuit cells, respectively, so that the second sensing circuit cells sense the electric field variation of the approaching object through the second sensing electrode cells and the second interconnect wires in conjunction with the sensing circuit cells.

3. The composite substrate sensor device according to claim 1, wherein the insulating layer set comprises three insulating layers.

4. The composite substrate sensor device according to claim 1, wherein the sensing circuit cells are arranged into a first array, the sensing electrode cells are arranged into a second array, each of the first array and the second array has an X-axis and a Y-axis perpendicular to each other, a dimension of the first array on the X-axis is smaller than or equal to a dimension of the second array on the X-axis, and a dimension of the first array on the Y-axis is smaller than or equal to a dimension of the second array on the Y-axis.

5. The composite substrate sensor device according to claim 1, wherein the sensing circuit cells are arranged into a first array, the sensing electrode cells are arranged into a second array, each of the first array and the second array has an X-axis and a Y-axis perpendicular to each other, a dimension of the first array on the X-axis is substantially equal to a dimension of the second array on the X-axis, a dimension of the first array on the Y-axis smaller than or equal to a dimension of the second array on the Y-axis.

6. The composite substrate sensor device according to claim 1, further comprising a device protection layer, which is disposed on the insulating layer set and the sensing electrode cells and directly or indirectly contacts with the object.

7. The composite substrate sensor device according to claim 1, wherein the sensing electrode cells are distributed over the first substrate sensing chip and the second substrate so that an area of the first substrate sensing chip is minimized without sacrificing a physical sensing area of the composite substrate sensor device.

8. The composite substrate sensor device according to claim 1, further comprising an electroconductive partitioning layer, which is disposed between the sensing electrode cell and the sensing circuit cell and coupled to a constant potential, and isolates the sensing electrode cell and the sensing circuit cell from interfering with each other.

9. The composite substrate sensor device according to claim 1, further comprising:
an electric field emitting cell, which is disposed on the upper surface of the insulating layer set, and disposed outside an array constituted by the sensing electrode cells, wherein the electric field emitting cell is coupled to a signal source and generates an electric field.

10. The composite substrate sensor device according to claim 9, further comprising a cover plate covering the electric field emitting cell.

* * * * *